(12) United States Patent
Frenal et al.

(10) Patent No.: US 10,543,559 B2
(45) Date of Patent: Jan. 28, 2020

(54) ELECTRIC ARC CUTTING OR WELDING TORCH WITH RAPID ASSEMBLY SYSTEM

(71) Applicant: Air Liquide Welding France, Paris (FR)

(72) Inventors: Antoine Frenal, Ezanville (FR); Samuel Vignerol, Louvres (FR); Thierry Renault, Marines (FR); Krishen Vithelingum, Asnieres sur Seine (FR)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 644 days.

(21) Appl. No.: 15/290,299

(22) Filed: Oct. 11, 2016

(65) Prior Publication Data
US 2017/0106464 A1 Apr. 20, 2017

(30) Foreign Application Priority Data
Oct. 15, 2015 (FR) .................................. 15 59785

(51) Int. Cl.
*B23K 10/00* (2006.01)
*B23K 10/02* (2006.01)
*H05H 1/34* (2006.01)

(52) U.S. Cl.
CPC .............. *B23K 10/02* (2013.01); *H05H 1/34* (2013.01)

(58) Field of Classification Search
CPC .... B23K 10/02; B23K 10/005; B23K 10/027; H05H 1/34; H05H 1/36
USPC .............. 219/121.48, 121.5, 121.51, 121.52, 219/121.39
See application file for complete search history.

(56) References Cited

U.S. PATENT DOCUMENTS

| | | | | |
|---|---|---|---|---|
| 4,914,271 A | * | 4/1990 | Delzenne | B23K 9/296 219/121.48 |
| 5,409,164 A | | 4/1995 | Delzenne et al. | |
| 5,874,707 A | | 2/1999 | Iida et al. | |
| 6,424,082 B1 | * | 7/2002 | Hackett | H05H 1/34 313/231.31 |

(Continued)

FOREIGN PATENT DOCUMENTS

| | | |
|---|---|---|
| EP | 0 599 709 | 6/1994 |
| EP | 0 941 018 | 9/1999 |
| FR | 2 949 698 | 3/2011 |

(Continued)

OTHER PUBLICATIONS

French Search Report and Written Opinion for corresponding FR 1559785, dated Jun. 24, 2016.

*Primary Examiner* — Mark H Paschall

(57) ABSTRACT

The invention relates to an electric arc cutting or welding torch comprising a torch body and torch head to be assembled to or disassembled from the torch body, the torch body comprising a peripheral wall and an axial housing, the axial housing comprising an orifice for receipt of at least part of the torch head, an actuator which is mobile in translation in the axial housing, at least one blocking element which is fitted so as to be mobile on the peripheral wall, the blocking element and the torch head each comprising reciprocal engagement means, the actuator being configured to maintain the blocking element spaced relative to the peripheral wall, the actuator also being configured to be displaced in the axial housing when the torch head is inserted in the orifice.

15 Claims, 6 Drawing Sheets

(56) References Cited

U.S. PATENT DOCUMENTS

2003/0160032 A1    8/2003   MacKenzie et al.
2018/0139833 A1*   5/2018   Patel ..................... B23K 10/00

FOREIGN PATENT DOCUMENTS

GB          2 091 594      8/1982
WO    WO 96 21339    7/1996

* cited by examiner

ELECTRIC ARC CUTTING OR WELDING TORCH WITH RAPID ASSEMBLY SYSTEM

CROSS REFERENCE TO RELATED APPLICATIONS

This application claims the benefit of priority under 35 U.S.C. § 119(a) and (b) to French Patent Application No. 1559785 filed Oct. 15, 2015, the entire contents of which are incorporated herein by reference.

BACKGROUND

The invention relates to an electric arc cutting or welding torch with a torch head, the assembly and disassembly of which relative to the torch body is made more reliable and more robust than in the prior art.

Electric arc cutting or welding torches with a head which can be dismantled comprise two main parts which can be assembled or disassembled relative to one another, i.e. a base or torch body which is habitually secured on the structure, such as a support frame provided with a mobile beam, and a removable torch head or nose.

Examples of plasma cutting torches with a head which can be dismantled are known in particular from documents EP-A-599709, GB-A-2091594, EP-A-801882 and EP-A-941018.

The torch head contains the consumables of the torch, typically an electrode, an upstream gas diffuser, an upstream nozzle, a downstream gas diffuser and a downstream nozzle, as well as the internal circuits for distribution of the gases and the cooling liquid.

The torch body is an interface between an electric generator, the high-frequency and/or high-voltage housing which is necessary for priming of the arc, the housing for regulation of the gases, and the cooling system.

As a result, the nozzles and electric wires obtained from the different elements converge towards the torch body which contains the different inputs and outputs for fluids, i.e. cooling fluid, plasma-producing gas and protective gas, as well as the electrical connections for the cathode and the priming and control circuits.

The torch head is supplied with fluids and electric current by means of the torch body. In addition, the torch body ensures the mechanical connection of the torch head to the remainder of the electric arc cutting or welding machine.

The consumables of the torch are wear parts. They are eroded more or less rapidly when the torch is used, and need to be replaced regularly.

The implementation of an electric arc cutting or welding torch habitually involves the following steps:
  fitting of the consumables in the torch head;
  assembly of the torch head on the torch body;
  selection of the process parameters and starting of the cutting or welding operation at the machine control panel;
  stoppage of the cutting or welding operation;
  disassembly of the torch head from the torch body in order to replace the worn consumables.

The fitting and dismantling of a torch head on or from a torch body require particular precautions in order to ensure the continuity of the fluid (gas and cooling liquid) and electrical connections of the torch, i.e. the sealing of the fluid duct connections and good contact between the electrical connections.

In particular, the alignment of the torch head and the torch body is essential in order to permit connection of the head to the torch body which is not only rapid, but which also does not damage the electrical and fluid connections which project at the upstream end of the head, and which must be fitted in housings with complementary connections situated in the torch body.

In addition, in the case of incorrect assembly, an electric arc can be established between the conductive parts of the torch head and the torch body. An electric arc of this type can lead to the destruction of the torch head and body.

An assembly process is known from document FR-A-2949698 consisting of screwing the head on the torch body by means of a screwing nut. The torch head and/or the torch body additionally comprise axial and angular polarisation means which make it possible to align the fluid ducts and the electrical connections of the head and the body before screwing and tightening the nut.

However, screwing of the nut is a problematic manual operation, on completion of which the operator has no way of knowing if the torch head is correctly engaged in the torch body. In fact, during intensive use of the torch in an aggressive environment such as that which exists when cutting metal plate, i.e. projections of molten metal, generation of fumes, UV radiation, heat, etc., the threads of the tightening nut on the torch head and/or the corresponding thread on the torch body are inevitably filled with a fine metal powder which makes the tightening operation difficult. Depending on the force applied, the operator can have the impression that the torch head is correctly engaged in the body, whereas in reality the fluid sealing and/or the electrical contact at the interface between the head and the torch body is/are defective.

A plasma arc cutting torch is also known from document FR-A-2698301, wherein the torch body comprises a ball cage which cooperates with a groove provided in the periphery of the torch head.

However, because of the aggressive environment encountered in industrial production, the movement of the balls tends to deteriorate rapidly and irreversibly. Ultimately, the torch body becomes unusable and must be replaced.

The problem which is posed is thus to provide an arc cutting or welding torch, the torch head and the torch body of which can be assembled or disassembled easily manually, without encountering the aforementioned problems, in particular whilst ensuring the continuity of the fluid and electrical connections of the body and the torch head, and in a manner which is more reliable and more robust than in the prior art.

SUMMARY

The solution according to the invention is thus an electric arc cutting or welding torch comprising a torch body and torch head which can be, and is designed to be, assembled to or disassembled from the torch body, the torch body comprising:
  a peripheral wall and an axial housing, the axial housing comprising an orifice (10a) for receipt of at least part of the torch head;
  an actuator which is mobile in translation in the axial housing;
  at least one blocking element which is fitted so as to be mobile on the peripheral wall, the blocking element and the torch head each comprising reciprocal engagement means;
  the actuator being configured to maintain the blocking element spaced relative to the peripheral wall, so as to permit the insertion of the torch head in the orifice; and the actuator also being configured to be displaced in the axial housing when the torch head is inserted in the orifice, so as to enable the blocking element to be brought towards the peripheral wall until the blocking element and the torch head engage.

Depending on the case, the torch according to the invention can comprise one or a plurality of the following characteristics:
- the blocking element is connected to the peripheral wall of the torch body via a hinge, the blocking element being mobile in pivoting around the hinge;
- the torch comprises at least two, and preferably at least three blocking elements which are distributed around the peripheral wall;
- the blocking element comprises a stop, the actuator being configured to be supported on the stop, so as to maintain the blocking element spaced from the peripheral wall;
- the actuator and/or the stop are formed to allow the blocking element to be brought progressively towards the peripheral wall when the torch head is inserted in the orifice in the axial housing;
- the actuator is displaced away from the orifice when the torch head is inserted in the orifice in the axial housing;
- the torch comprises a first elastic element which is configured to exert an elastic compression force which tends to displace the actuator in the direction of the orifice in the axial housing;
- an outer ring forms a sleeve around at least part of the torch body, the outer ring being mobile in translation around the torch body;
- the torch comprises a second elastic element which is configured to exert an elastic compression force which tends to displace the outer ring in the direction of the downstream orifice in the axial housing;
- the blocking element cooperates with the outer ring such that, when the blocking element is spaced from the peripheral wall by the actuator, the blocking element tends to oppose the movement of translation of the outer ring in the direction of the orifice in the axial housing;
- the blocking element cooperates with the outer ring such that the engagement of the blocking element and the torch head gives rise to the displacement of the outer ring in the direction of the orifice in the axial housing, such that the outer ring prevents disengagement of the blocking element and the torch head;
- the blocking element cooperates with the outer ring, such that spacing of the ring from the orifice gives rise to spacing of the blocking element from the peripheral wall, and disengagement of the blocking element and the torch head, the actuator being configured to exert a force on the torch head which tends to eject the torch head from the orifice;
- a compressible element is arranged between the torch body and the torch head;
- the ratio (F2/F1) of the second load (F2) applied to the second elastic element, and of the first load (F1) applied to the first elastic element, is between 0.1 and 0.95, and preferably between 0.7 and 0.8.

The electric arc cutting or welding torch according to invention is advantageously an electric arc plasma cutting torch, a plasma welding torch, TIG, MIG or the like.

In addition, the invention relates to an electric arc cutting or welding process, in which a torch according to the invention is implemented in order to cut or weld a metal part, which in particular is made of carbon steel, stainless steel, aluminium or aluminium alloy.

Advantageously, the process according to the invention is a process for electric arc plasma cutting.

BRIEF DESCRIPTION OF THE DRAWINGS

The present invention will be explained in greater detail with reference to the appended figures in which.

DESCRIPTION OF PREFERRED EMBODIMENTS

The figures of the present application schematize embodiments of the invention according to which the torch is an electric arc plasma cutting torch.

It will be appreciated that the present invention is applicable for any type of cutting or welding torch which implements an electric arc.

Figure 1:
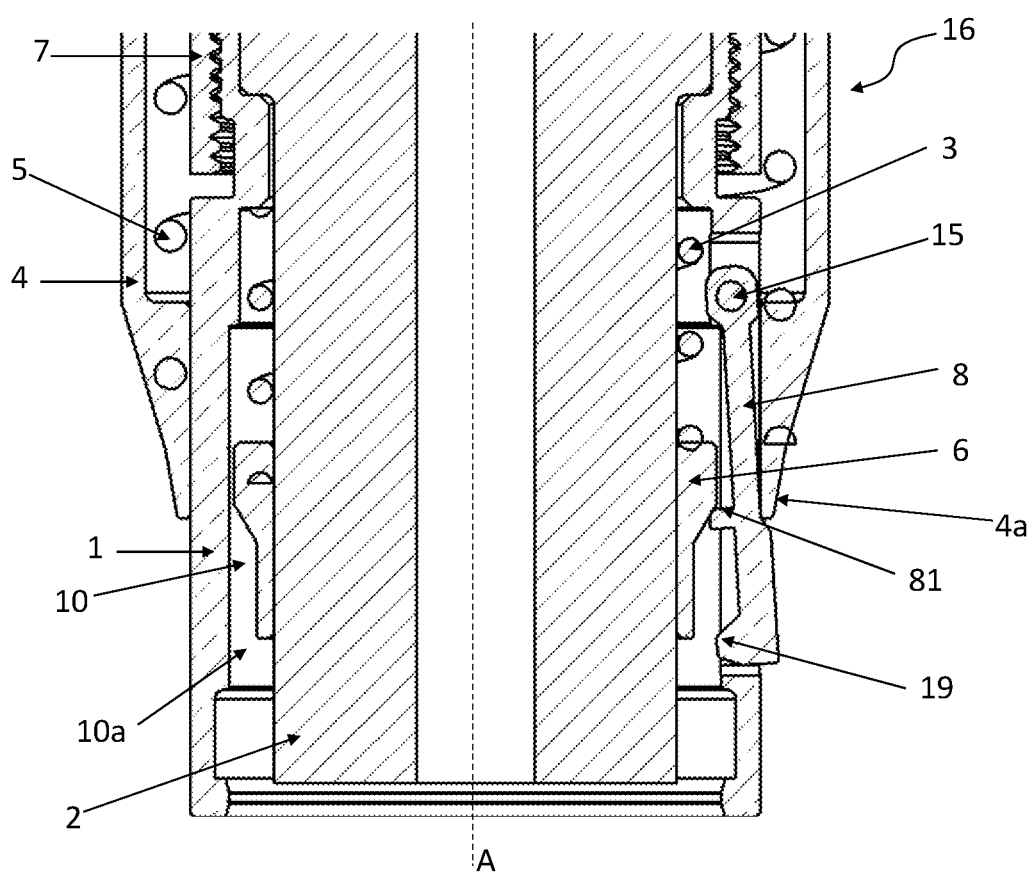
FIG. 1 schematizes in longitudinal cross-section a plasma cutting or welding torch body according to an embodiment of the invention.

FIG. 1 schematizes the body 16 of a plasma cutting torch in a position in which it is disassembled from the torch head (not illustrated). The torch head 16 comprises a peripheral wall 1 and an electrode holder 2 which forms a cathode. The electrode holder 2 serves the purpose of conveying the electric current to the electrode of the torch head, whereas the peripheral wall 1 forms an insulating block which ensures electrical insulation between the electrode holder 2 and the element which supports the nozzle of the torch head 17.

The torch body 16 comprises an axial housing 10 in which the electrode holder 2 is arranged, the axial housing 10 comprising in its downstream end an orifice 10a which is designed to receive the upstream part 17a of the torch head 17.

The peripheral wall 1 and the electrode holder are kept together by means of a shaft 7 shown partly in FIG. 1, which is screwed around the peripheral wall 1.

According to a preferred embodiment of the invention, the torch body 16 comprises an actuator 6 which is arranged in the axial housing 10, and is mobile in translation in the axial housing 10. Preferably, the actuator 6 is arranged between the peripheral wall 1 and the electrode holder 2. Advantageously, the actuator 6 is arranged connected mechanically to the electrode holder 2 by a slide connection.

In addition, the torch body 16 comprises at least one blocking element 8 which is fitted so as to be mobile on the peripheral wall 1. According to a preferred embodiment, the blocking element 8 is fitted so as to pivot on the peripheral wall 1 of the torch body 16 via a hinge 15.

Advantageously, the torch body 16 comprises a plurality of blocking elements 8 distributed around the peripheral wall 1. There are preferably at least two blocking elements 8, and ideally three of them. The maximum number of blocking elements 8 is advantageously five.

According to the invention, when the torch is in the disassembled position, i.e. when the torch head 17 is disassembled from the torch body 16, the actuator 6 is configured to maintain the blocking element 8 spaced from the peripheral wall 1 of the torch body 16. Thus, as illustrated in FIG. 1, the actuator 6 exerts pressure on at least part of the inner face of the blocking element 8, so as to pivot the blocking element 8 towards the exterior of the torch, in order to space it from the peripheral wall 1.

The blocking element 8 advantageously comprises a stop 81 against which the actuator 6 is supported. Preferably, the stop 81 is a projection 81 which is provided on the inner face of the blocking element 8. It is then the pressure exerted on the stop 81 which makes it possible to space the blocking element 8.

According to the preferred embodiment of the invention, the torch comprises a first elastic element 3, which is configured to exert an elastic compression force which tends to displace the actuator 6 downwards, in the direction of the orifice 10*a* in the axial housing 10. Preferably, the first elastic element 3, for example a helical spring 3, is arranged in the axial housing 10. Advantageously, the first elastic element 3 is arranged between the actuator 6, the peripheral wall 1 and the electrode holder 2.

According to a variant of the invention, the first elastic element 3 can be replaced by pressurising the volume which is delimited by the actuator 6, the peripheral wall 1 and the electrode holder 2. In other words, a pressure exists in this volume which is greater than atmospheric pressure, such as in the conventional pneumatic or hydraulic jack systems in which the excess pressure is obtained by introducing a pressurised gas or liquid into a compression chamber.

Thus, in the absence of a torch head inserted in the axial housing 10, the actuator 6 can be displaced in the axial housing 10 until pressure is exerted on the inner face of the blocking element 8, advantageously at the stop 81, so as to make the blocking element 8 pivot towards the exterior, which spaces it from the peripheral wall 1.

According to a particularly advantageous embodiment, the torch body 16 additionally comprises an outer ring 4 which forms a sleeve around at least part of the torch body 16. The outer ring 4 is mobile in translation around the torch body 16.

Advantageously, the blocking element 8 is formed such that, when the blocking element 8 is spaced from the peripheral wall 1 by the actuator 6, the blocking element 8 tends to oppose a movement of translation of the outer ring 4 in the direction of the orifice 10*a*.

As can be seen in FIG. 1, the pivoting of the blocking element 8 caused by the thrust of the actuator 6 thrusts the outer ring upwards, i.e. moving it away from the orifice 10*a*. Preferably, the displacement upwards of the outer ring 4 is limited by stop means which are preferably provided on the outer ring 4 and/or the shaft 7, which also makes it possible to limit the pivoting of the blocking element 8.

Figure 2:
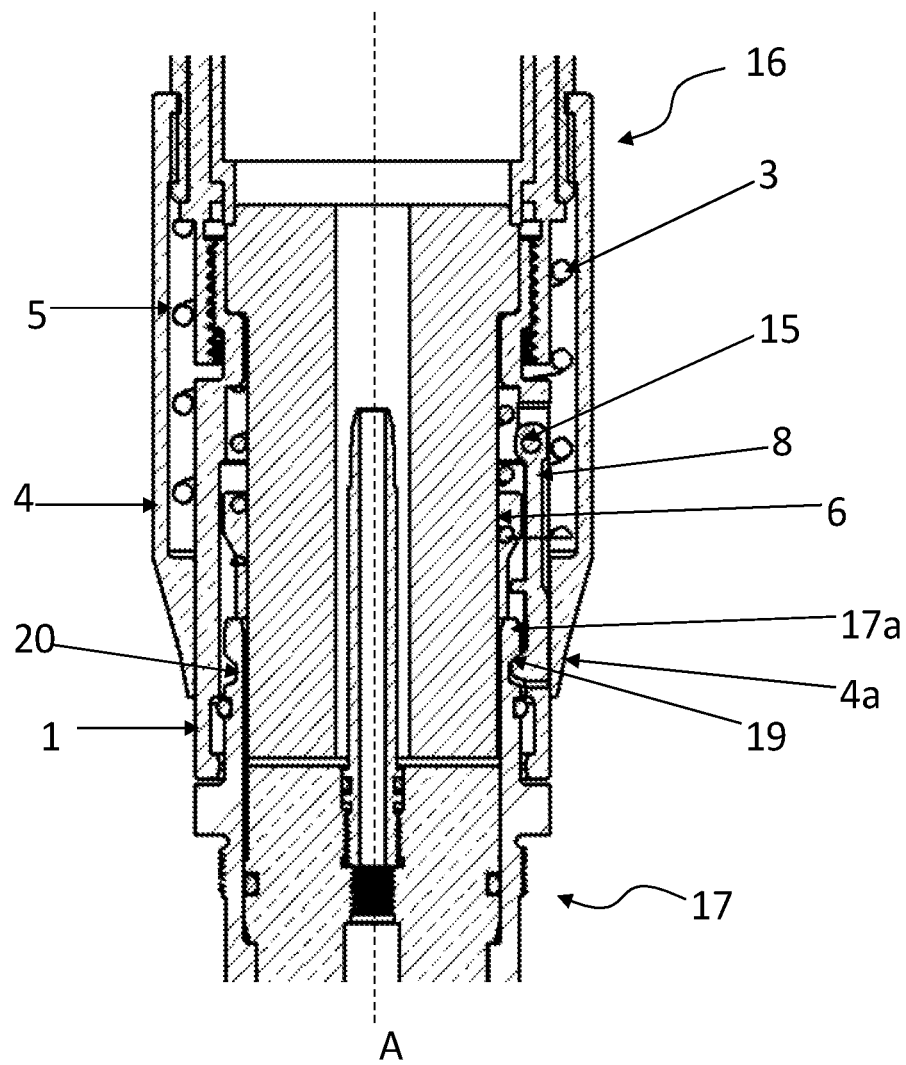
FIG. 2 is a view in partial longitudinal cross-section of a torch head according to the invention assembled on a torch body according to FIG. 1.

FIG. 2 schematizes the assembly of a torch body according to FIG. 1 on a torch head 17. The torch head 17 comprises in a conventional manner in its lower part an electrode, a nozzle, and a protective cover (not illustrated).

The blocking element 8 and the torch head 17 each comprise means 19, 20 for engagement with one another. The engagement means 19, 20 can be at least one projection 19 provided on the blocking element 8, which cooperates with an opening or groove 20 provided in the upstream part 17*a* of the torch head 17. In an equivalent manner, a projection 19 and an opening or groove 20 can be provided in the torch head 17 and the torch body 16 respectively.

According to the invention, the actuator 6 is configured to be displaced, preferably axially, in the axial housing 10, when the torch head 17 is inserted in the orifice 10*a*, with the displacement of the actuator 6 bringing the blocking element 8 towards the peripheral wall 1, until the blocking element 8 and the torch head 17 engage.

By design, when the blocking element 8 and the torch head 17 are engaged, the electrical contact and the fluid sealing are ensured between the head and the torch body. The torch assembly can thus be carried out in a manner which is reliable and reproducible by the operator.

According to the embodiment illustrated in FIG. 2, the plasma torch is assembled by inserting the upstream part 17*a* of the torch head 17 in the orifice 10*a* until it comes into contact with the actuator 6, in order to exert on it a force which opposes and exceeds the force exerted by the first elastic element 3. The actuator 6 is then thrust upwards, which releases the blocking element 8, and allows it to approach the peripheral wall 1.

Preferably, when the blocking element 8 and the torch head 17 are engaged via the engagement means 19, 20, the blocking element 8 is aligned with the peripheral wall 1, such that the blocking element 8 no longer prevents a movement of translation of the outer ring 4 in the direction of the orifice 10*a*. The term "aligned" means that the outer surface of the blocking element is positioned flush with, or recessed from, the peripheral wall 1, such that the blocking element 8 does not form, or scarcely forms, an excess thicknesses relative to the peripheral wall 1, thus permitting the translation of the outer ring 4 along the peripheral wall 1 in the direction of the orifice 10*a*.

Thus, the blocking element 8 can be displaced between at least two positions, i.e. a so-called "spaced" position, in which the blocking element 8 is maintained towards the exterior, i.e. spaced from the peripheral wall 1 by the actuator 6, and a so-called "close" position, in which the blocking element 8 is positioned in the extension of the peripheral wall 1, and forms a substantially zero angle with the peripheral wall 1. It will be appreciated that the blocking element 8 can occupy intermediate positions between the spaced position and the close position, these intermediate positions depending in particular on the position of the outer ring 4 around the torch body 16 and/or the position of the actuator 6 in the axial housing 10.

As illustrated in FIG. 1, the outer ring 4 comprises a downstream end 4*a* which extends according to a longitudinal direction around the axis A of the torch, and comes opposite the blocking element 8, so as to maintain it engaged with the upstream part 17*a* of the torch head 17. By this means, the locking of the torch assembly is ensured by the outer ring 4, which forms a sleeve around at least part of the blocking element 8. The outer ring 4 then occupies a so-called "low" position.

Preferably, the torch comprises a second elastic element 5 which can be a helical spring, arranged so as to exert an elastic compression force which tends to displace the outer ring 4 in the direction of the downstream orifice 10*a* in the axial housing 10.

The second elastic element 5 is preferably arranged between the outer ring 4 and the peripheral wall 1.

The disassembly of the torch according to the invention advantageously takes place according to the steps illustrated in FIGS. 3*a* to 3*d*.

Figure 3A:
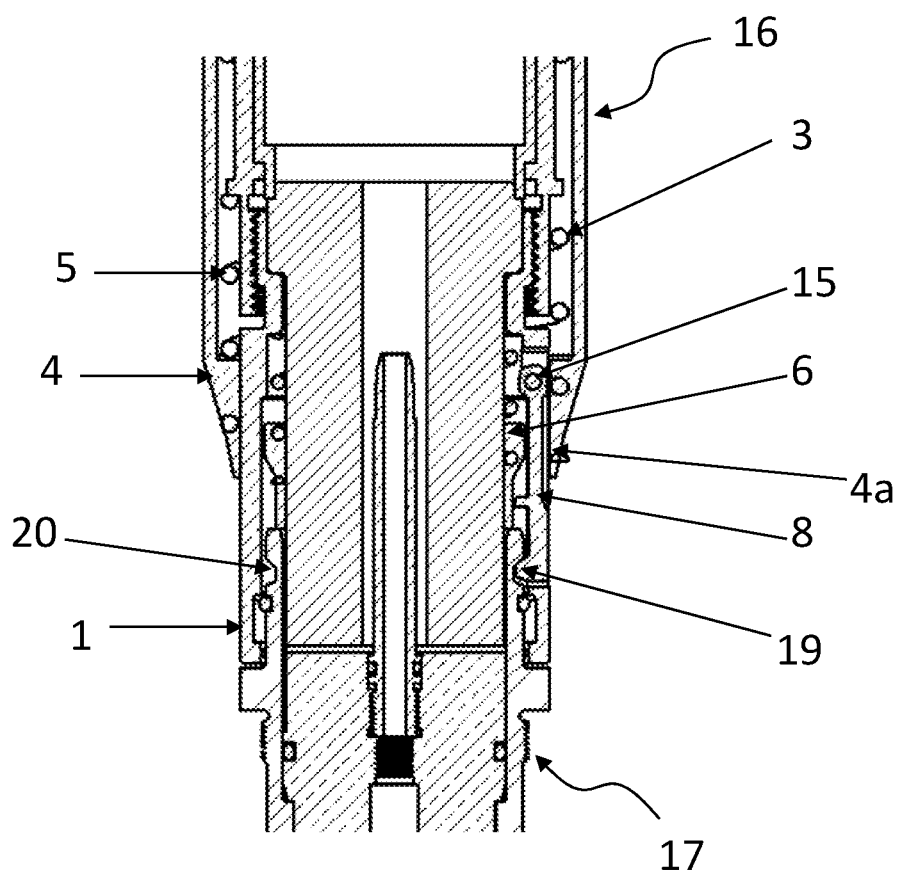
FIGS. 3a, 3b, 3c and 3d schematize steps of the disassembly of a torch head and a torch body according to the invention.
Figure 3B:
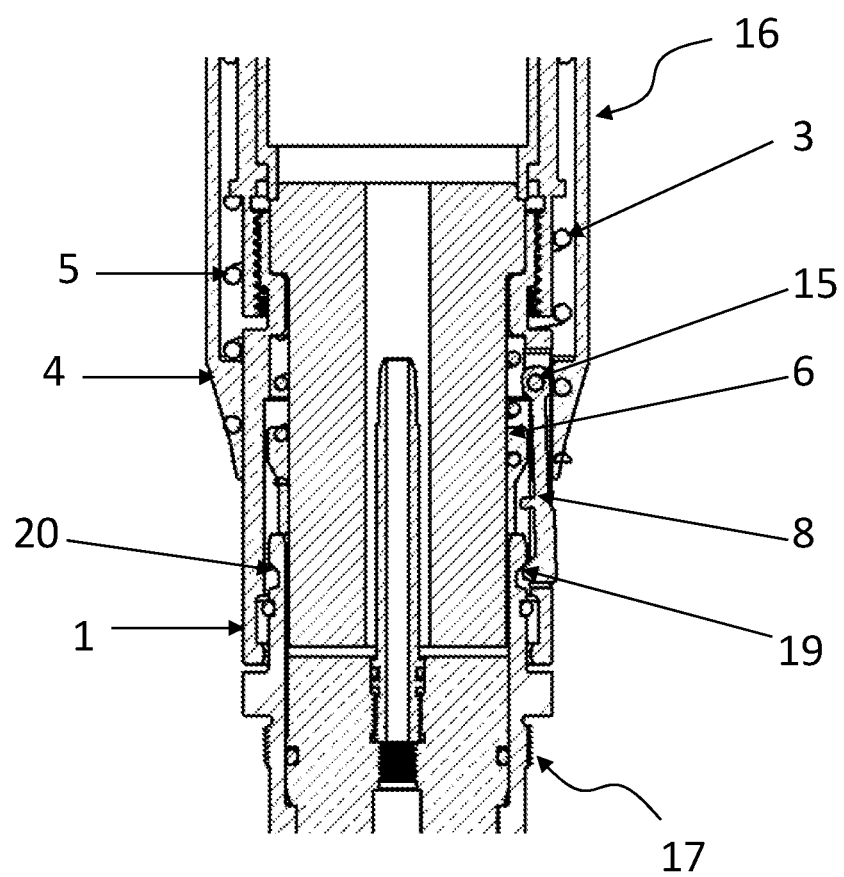
Figure 3C:
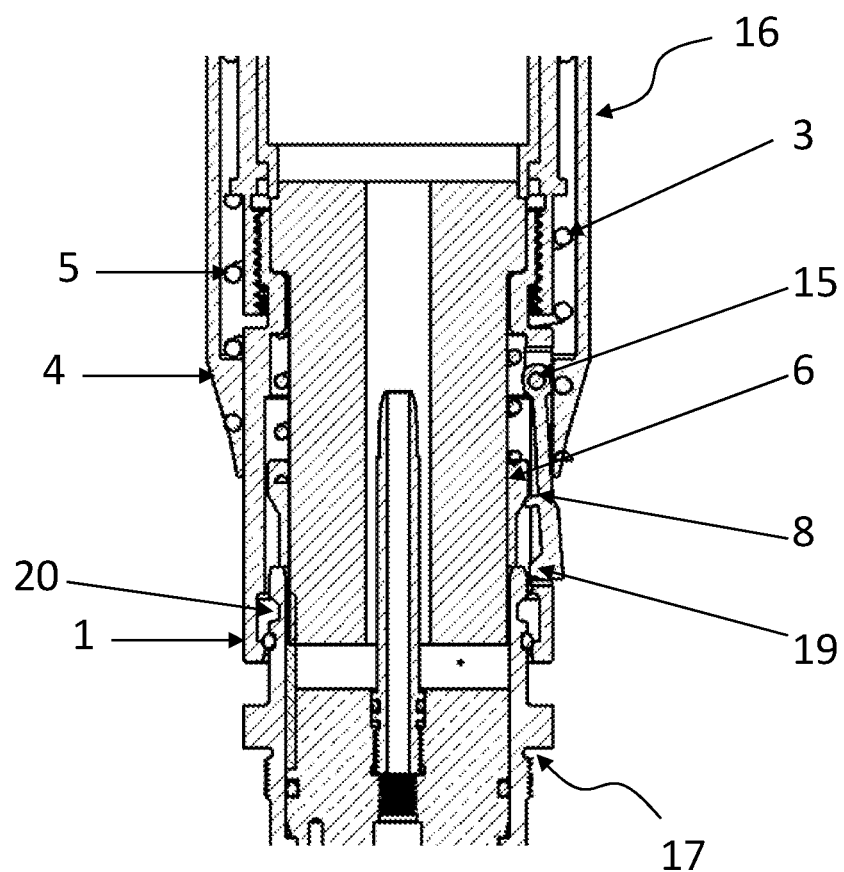
Figure 3D:
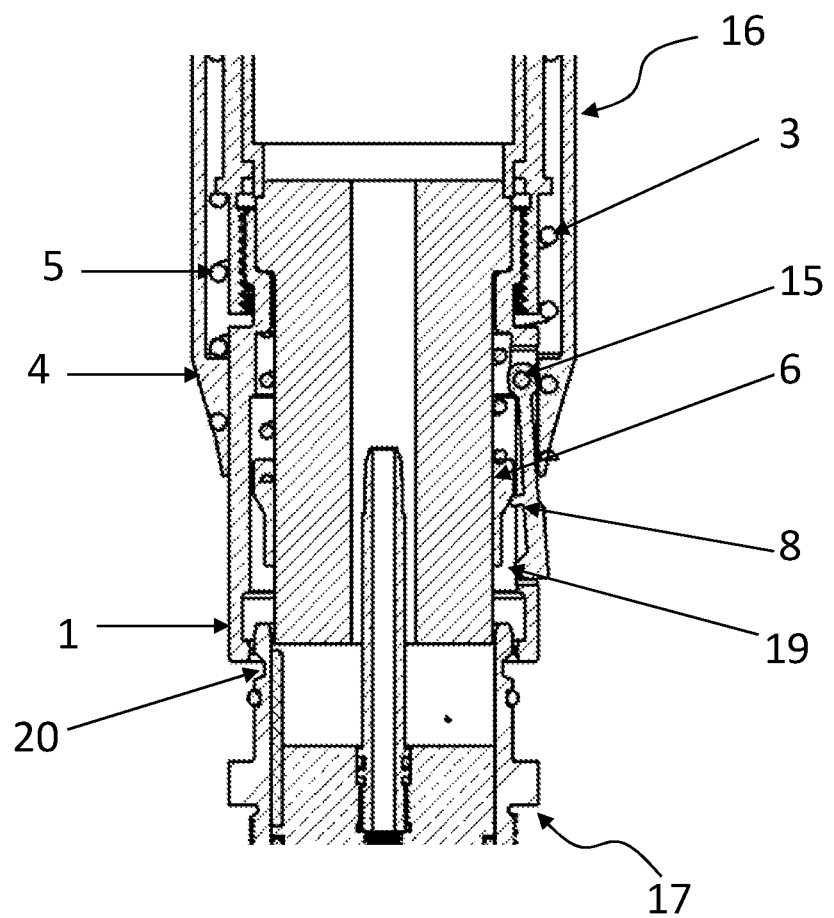

In order to disassemble the torch head 17 from the torch body 16, the operator displaces the outer ring 4 by moving it away from the orifice 10*a* (FIG. 3*a*). The blocking element 8 is thus released from the constraint of the outer ring 4, and can pivot towards the exterior of the torch, and be disengaged from the upstream end 17*a* of the torch head 17 (FIG. 3*b*). The ejector 6, which is no longer blocked by the stop 81 of the blocking element 8, is translated towards the orifice 10a under the effect of the force exerted by the elastic element 3 (FIG. 3c). The extent of the force exerted by the elastic element is advantageously such that the torch head 17 is ejected by the orifice 10a without the operator needing to exert traction movement on the torch head 17.

Optionally, the torch comprises braking means 22 which are configured to brake the movement of ejection of the torch head 17 through the orifice 10a. This prevents the risk of sudden ejection of the torch head 17, and/or makes it possible to eliminate uncertainty of the tolerance relating to the force exerted by the elastic element 3. Preferably, a compressible element 22 is arranged between the torch body 16 and the torch head 17. The compressible element 22 can be an elastomer O-ring seal, and can advantageously have a compression force which takes the form of a deformation distance of the elastomer at the torus diameter of between 0.01 and 1 mm.

Within the context of the invention, it is advantageous to ensure that a first load F1 is applied to the first elastic element 3 which is greater than the second load F2 applied to the second elastic element 5. Preferably, the dimensions of the first and second elastic elements will be such that the ratio F2/F1 of the second load F2 applied to the second elastic element 5, to the first load F1 applied to the first elastic element 3, is between 0.1 and 0.95, more preferably between 0.7 and 0.8, and ideally approximately 0.75. These force ratio values make it possible to ensure that the outer ring 4 remains well in the low position in order to lock the blocking element 8.

By way of non-limiting example, in the case of a ratio F2/F1 equal to 0.75, the first load F1 will be 40 N and the second load F2 will be 30 N.

The present invention thus makes it possible to carry out the assembly of the torch head 17 on the torch body 16 in a reliable and robust manner, whilst providing the operator with good longitudinal positioning. In addition, the assembly and disassembly of the torch head 17 relative to the torch body 16 is simple and rapid, since it requires a minimum number of actions by the operator, i.e. assembly by inserting the head 17 in the body 16 so as to exert a thrust on the actuator 6, and disassembly by raising the outer ring 4.

What is claimed is:

1. An electric arc cutting or welding torch comprising a torch body and torch head which is able and designed to be assembled to or disassembled from the torch body, the torch body comprising:
   a peripheral wall and an axial housing, the axial housing comprising an orifice for receipt of at least part of the torch head;
   an actuator which is mobile in translation in the axial housing in the axial direction;
   at least one blocking element which is fitted so as to be hingedly mobile on the peripheral wall, the blocking element and the torch head each comprising a corresponding locking mechanism to limit axial displacement of the torch head within the torch body;
   the actuator being configured to maintain the blocking element spaced relative to the peripheral wall, so as to permit the insertion of the torch head in the orifice; and
   the actuator also being configured to be displaced in the axial housing when the torch head is inserted in the orifice, so as to enable the blocking element to be brought towards the peripheral wall until the blocking element and the torch head engage.

2. The torch of claim 1, wherein the blocking element is connected to the peripheral wall of the torch body via a hinge, the blocking element being hingedly mobile in pivoting around the hinge.

3. The torch of claim 1, wherein said torch comprises at least two blocking elements which are distributed around the peripheral wall.

4. The torch of claim 1, wherein the blocking element comprises a stop, the actuator being configured to be supported on the stop, so as to maintain the blocking element spaced from the peripheral wall.

5. The torch of claim 4, wherein the actuator and/or the stop are formed to allow the blocking element to be brought progressively towards the peripheral wall when the torch head is inserted in the orifice in the axial housing.

6. The torch of claim 1, wherein the actuator is displaced away from the orifice when the torch head is inserted in the orifice in the axial housing.

7. The torch of claim 1, wherein said torch comprises a first elastic element which is configured to exert an elastic compression force which tends to displace the actuator in the direction of the orifice in the axial housing.

8. The torch of claim 1, wherein an outer ring forms a sleeve around at least part of the torch body, the outer ring being mobile in translation around the torch body.

9. The torch of claim 8, wherein said torch further comprises a second elastic element which is configured to exert an elastic compression force which tends to displace the outer ring in the direction of the orifice in the axial direction.

10. The torch of claim 8, wherein the blocking element cooperates with the outer ring such that, when the blocking element is spaced from the peripheral wall by the actuator, the blocking element tends to oppose the movement of translation of the outer ring in the direction of the orifice in the axial housing.

11. The torch of claim 8 wherein the blocking element cooperates with the outer ring such that the engagement of the blocking element and the torch head gives rise to the displacement of the outer ring in the direction of the orifice in the axial housing, such that the outer ring prevents disengagement of the blocking element and the torch head.

12. The torch of claim 1, wherein the blocking element cooperates with the outer ring, such that spacing of the ring from the orifice gives rise to spacing of the blocking element from the peripheral wall, and disengagement of the blocking element and the torch head, the actuator being configured to exert a force on the torch head which tends to eject the torch head from the orifice.

13. The torch of claim 1, wherein a compressible element is arranged between the torch body and the torch head.

14. The torch of claim 9, wherein said torch comprises a first elastic element which is configured to exert an elastic compression force which tends to displace the actuator in the direction of the orifice in the axial housing, wherein a ratio of a second load applied to the second elastic element, and of a first load applied to the first elastic element, is between 0.1 and 0.95.

15. An electric arc cutting or welding process in which a torch of claim 1 is implemented in order to cut or weld a metal part.

* * * * *